July 6, 1965    R. L. TWEEDALE    3,193,118
GRAIN TANK AND CONVEYOR MECHANISM FOR COMBINES
Filed June 3, 1964    4 Sheets-Sheet 1

INVENTOR.
Ralph L. Tweedale
BY
Wolfe, Hubbard, Voit & Osann
ATTORNEYS

July 6, 1965                R. L. TWEEDALE                3,193,118
               GRAIN TANK AND CONVEYOR MECHANISM FOR COMBINES
Filed June 3, 1964                                    4 Sheets-Sheet 2

INVENTOR.
Ralph L. Tweedale
BY
Wolfe, Hubbard, Voit & Osann
ATTORNEYS

July 6, 1965    R. L. TWEEDALE    3,193,118
GRAIN TANK AND CONVEYOR MECHANISM FOR COMBINES
Filed June 3, 1964    4 Sheets-Sheet 4

INVENTOR.
Ralph L. Tweedale
BY
Wolfe, Hubbard, Voit & Osann
ATTORNEYS.

3,193,118
GRAIN TANK AND CONVEYOR MECHANISM FOR COMBINES
Ralph L. Tweedale, Southfield, Mich., assignor to Massey-Ferguson Inc., Detroit, Mich., a corporation of Maryland
Filed June 3, 1964, Ser. No. 372,343
3 Claims. (Cl. 214—17)

This invention is a continuation-in-part of Serial No. 240,956, now Patent No. 3,157,297 and Serial No. 241,198, now Patent No. 3,159,289.

This invention relates generally to crop harvesting machines such as self-propelled combines, and concerns, more particularly, an improved grain tank and conveyor mechanism for temporarily storing and handling harvested grain in such machines.

A self-propelled combine of the type with which the invention is concerned includes a pair of grain receiving tanks arranged to straddle the cleaning and separating unit of the combine. A crop conveyor at the bottom of the cleaning and separating unit collects the threshed grain and carries it to a grain elevator which lifts the grain to a filling conveyor which deposits the grain in the pair of tanks.

The invention lies in providing such a combine with a transfer conveyor for moving grain from one side tank to the other and in arranging the transfer and discharge augers in such a manner that no openings are created through the cleaning and separating unit of the combine enclosed within a gabled top portion of the combine body. More particularly, the invention contemplates providing such a transfer conveyor including a sloping tubular portion disposed generally parallel to one side of the gabled roof portion of the combine body for unloading one of the side tanks and for discharging the grain down over the gabled roof into the other side tank.

Other objects and advantages of the invention will become apparent upon reading the following detailed description and upon reference to the drawings in which.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Figure 1:
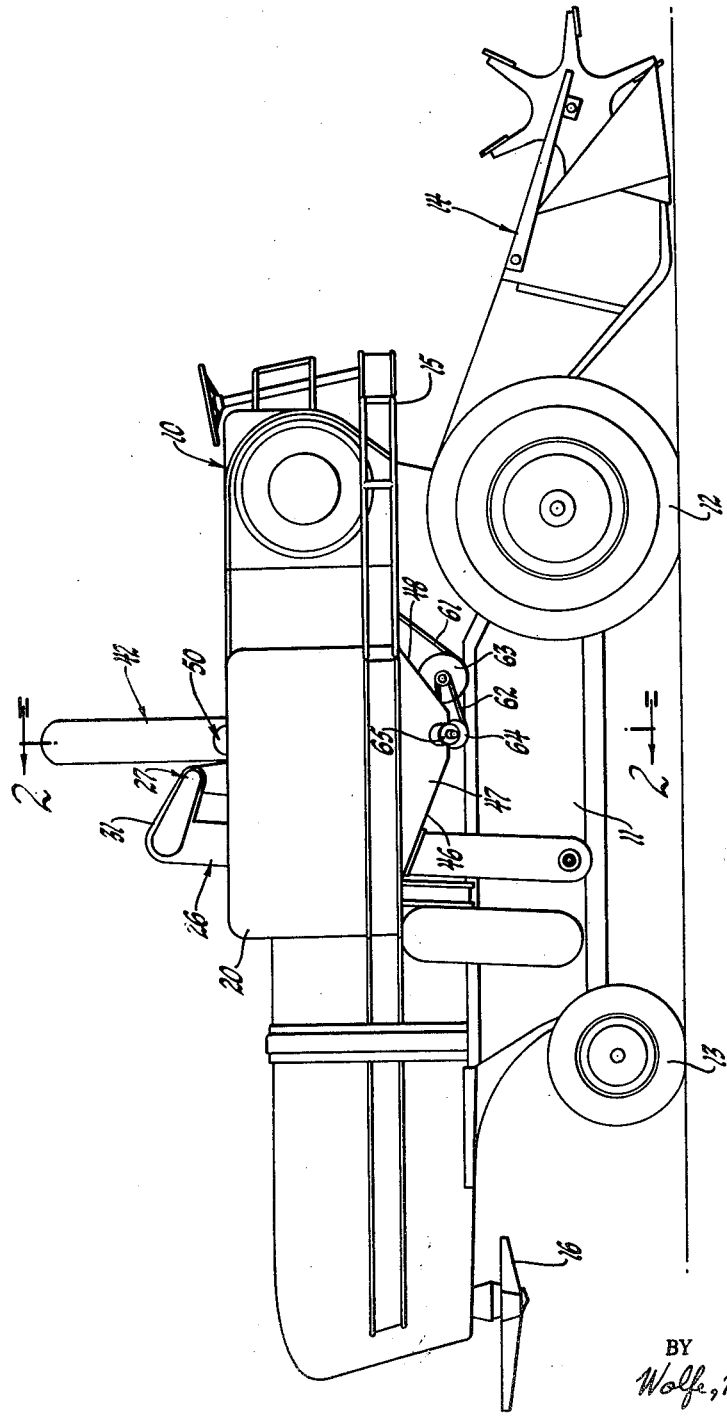
FIGURE 1 is a side elevation of one embodiment of a self-propelled combine embodying the present invention.

Turning first to FIGURE 1, there is shown one form of a self-propelled combine 10 embodying the invention which includes a main body portion 11 supported by front driving wheels 12 and rear steering wheels 13. A grain header assembly 14 is supported at the forward end of the combine, and an operator's platform 15 is disposed at the front of the combine so as to overlook the header assembly. The combine body 11 encloses grain threshing and separating mechanisms, and a straw scatterer 16 is journalled at the rear of the combine.

In order to receive and temporarily store the harvested grain, the combine 10 is provided with a pair of side or saddle tanks 20 and 21 extending down along the opposite sides of the combine body 11 and which are interconnected by a center tank portion 22 lying above an upwardly sloping, or gabled, top 23 of the combine body. A crop conveyor 24 collects the grain from the separating mechanism of the combine and carries it to a loading elevator 26 that lifts the grain to a filling conveyor 27 which selectively distributes the grain between the side tanks 20, 21 so that the relative loading of each tank can be varied or kept equal.

The loading elevator 26 includes a vertical housing structure 28 enclosing a continuous chain 29 on which a plurality of pusher flights 30 are mounted for elevating the grain. The elevated grain is discharged by the flights 30 into a hood 31 which interconnects the elevator 26 and the filling conveyor 27. The filling conveyor 27 includes an auger 32 journalled in a channel defined by a tube 33 having a discharge opening 34 above the side tank 21.

To selectively fill the side tanks 20, 21, a discharge door 35 is located in the lower portion of the hood 31. The door 35 is pivotally mounted on a pin 35a on the underside of the hood 31 and is positioned above the side tank 20.

Figure 2:
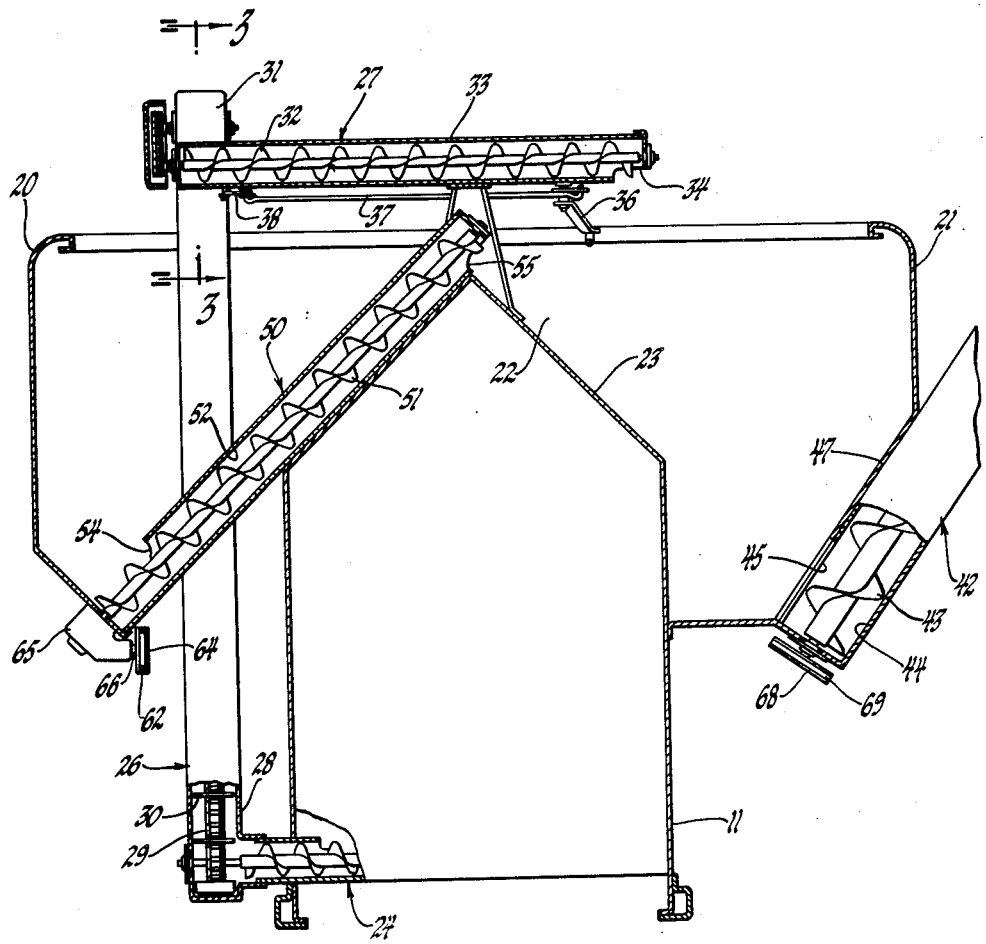
FIG. 2 is an enlarged transverse sectional view taken along the line 2—2 of FIG. 1 through the storage tanks and cleaning and separating unit of the combine.

To adjust the position of the door 35, a bell crank 36 is pivoted to the underside of the tube 33 (see FIG. 2) and a control rod 37 couples one arm of the bell crank 36 to a second bell crank 38. The second bell crank 38 is linked by a rod 39 to a lever 40 secured to the door 35. The other arm of the bell crank 36 extends forwardly of the combine so that the operator, sitting on the platform 15, can reach behind him and rotate the bell crank 36 to position the door 35 as desired.

Figure 3:
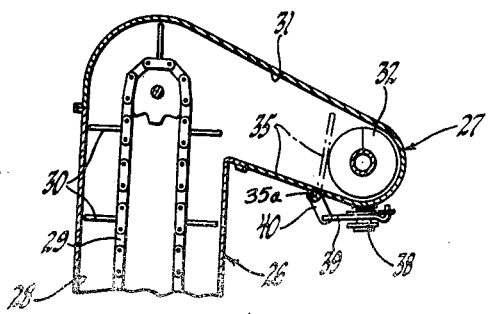
FIG. 3 is an enlarged sectional view taken substantially along the line 3—3 in FIG. 2.

When the door 35 is completely closed, as shown in the solid line position in FIG. 3, all of the grain lifted by the elevator 26 will be deposited into the filling conveyor 27 and through the opening 34 into the side tank 21. However, when the door 35 is opened, as shown in the dotted line position in FIG. 3, the grain will be deposited into the side tank 20. Accordingly, by positioning the door 35 the combine operator can selectively deposit grain in either of the side tanks.

By alternatively depositing equal amounts of grain in each of the two tanks 20, 21 the combine can be kept in lateral balance as the amount of grain temporarily stored in each of the tanks increases. Alternatively, one or the other of the two side tanks 20, 21 can be deliberately loaded a greater extent than the other tank so that the combine is placed in lateral unbalance. This is often desirable to provide stability for the combine when it is working on sharply sloping ground. Through the bell crank 36, the operator of the combine can selectively control the loading of the individual side tanks.

In order to unload the combine 10, a discharge conveyor 42 is coupled to the side tank 21. The discharge conveyor 42 includes an auger 43 journalled in a tube 44 that extends upwardly and outwardly from the combine body 11. The discharge conveyor 42 includes an opening 45 through which grain is received from the bottom of the side tank 21. To facilitate downward movement of grain from the side tank 21 into the opening 45, the side tank includes downwardly sloping bottom walls 46, 47 and 48 (see FIG. 1).

In accordance with the present invention, a sloping transfer conveyor 50 is provided to unload the grain from the side tank 20 and temporarily move the grain into the side tank 21. The transfer conveyor 50 includes an auger 51 journalled in a tubular passage 52 disposed along one side of the gabled roof portion 23 of the combine cleaning and separating unit. An opening 54 in the conveyor 50 receives grain from the side tank 20 and an opening 55 at the upper end of the conveyor discharges the grain down the other sloping side of the cleaning and separating unit into the side tank 21. It will be apparent that by angling the transfer conveyor 50 along the gabled top 23 of the cleaning and separating unit it is not necessary to create any openings in the wall of the cleaning and separating unit to transfer grain from one side tank 20 to the other side tank 21.

For driving the transfer conveyor 50, drive belts 61 and 62 couple the combine engine through a speed-reducing pulley 63 to a drive pulley 64 mounted on a gear case 65. The gear case 65 encloses a shaft 66 and bevel gears (not shown) which are drivingly coupled to the auger 51. The discharge conveyor 42 is driven by a pulley 68 coupled to the auger 43 and driven by a belt 69 suitably connected to a drive pulley on the combine engine.

To facilitate the rapid unloading of the side tanks 20, 21, the discharge conveyor 42 has a larger capacity than the transfer conveyor 50. To this end, it will be noted that the discharge auger 43 is larger in diameter than the transfer auger 51. Moreover, the discharge auger 43 is rotated at a speed which is effective to remove all of the grain from the side tank 21 contemporaneously with the transferral of the grain in side tank 20 by the transfer auger 51. Thus, there is no danger that the grain transferred from side tank 20 into the othe side tank 21 will overflow, and in this way the two side tanks can be exhausted essentially simultaneously.

Figure 4:
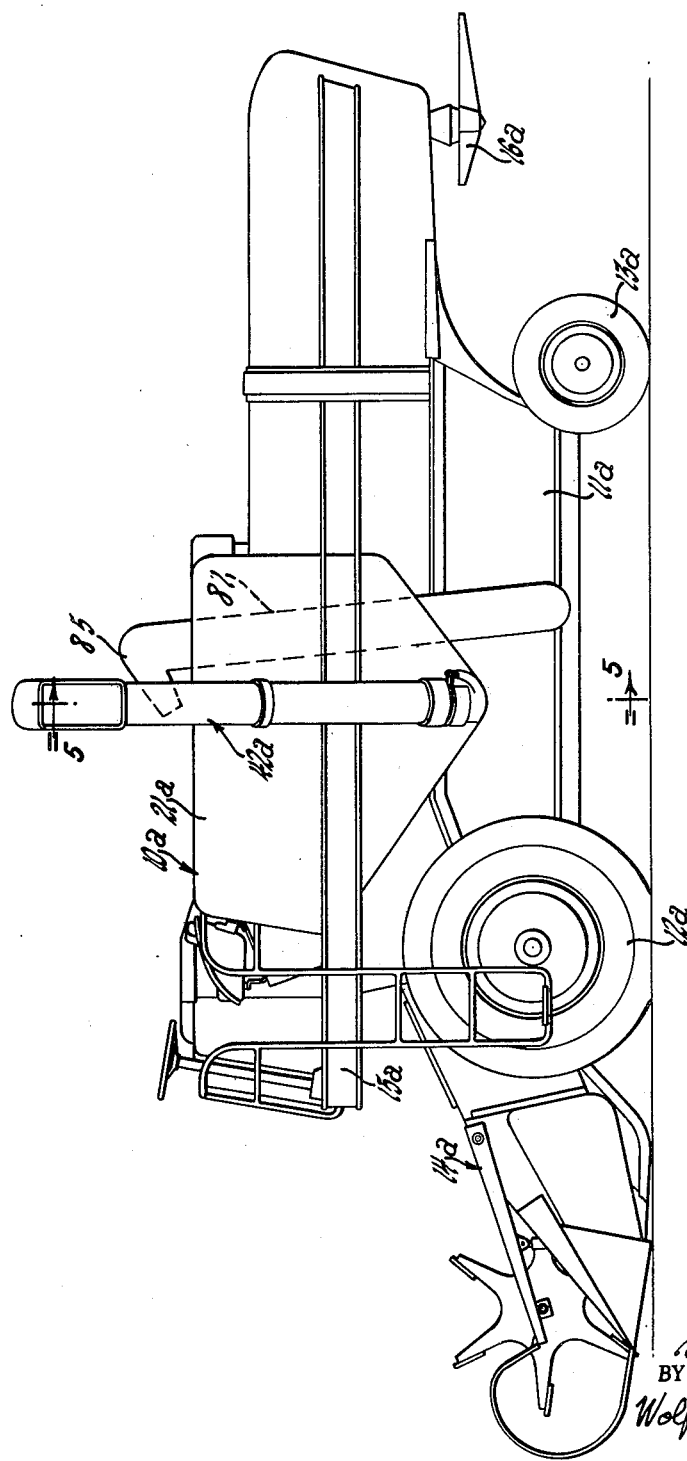
FIG. 4 is a side elevation of another self-propelled combine embodying a modification of the present invention.
Figure 5:
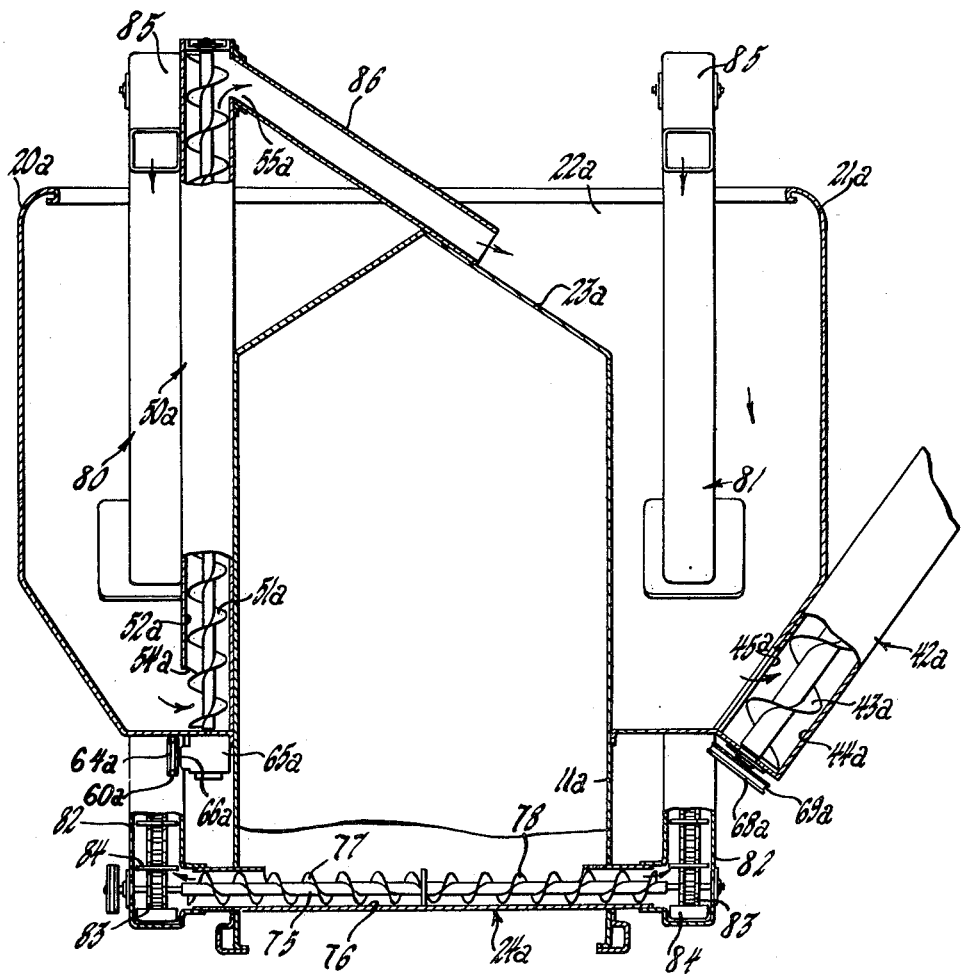
FIG. 5 is an enlarged transverse sectional view taken approximately along the line 5—5 in FIG. 4 through the storage tanks and cleaning and separating unit of the combine.

Turning now to FIGS. 4 and 5, there is shown another form of a self-propelled combine 10a also embodying the present invention. In this embodiment of the invention similar reference numbers, but with the suffix "a" have been used to designate parts corresponding to those in the first embodiment. Thus, the combine 11a encloses grain cleaning and separating mechanisms, and a straw scatterer 16a is journalled at the rear of the combine. The combine 10a is also provided with a pair of side or saddle tanks 20a and 21a extending down along the opposite sides of the combine body 11a and are interconnected by a center tank portion 22a lying above an upwardly sloping, or gabled top 23a of the combine body 11a.

To collect the harvested grain in this embodiment of the invention, a dually directed crop conveyor 24a is situated beneath the separating mechanism of the combine. The crop conveyor 24a includes a shaft 75 journalled in a tube 76. As shown in FIG. 5, a first auger flight 77 is wound on the left hand portion of the shaft 75 and a second auger flight 78 is wound on the right hand portion of the shaft 75. The two auger flights 77, 78 are adapted to divide the harvested grain and direct it outwardly from the center of the cleaning and separating unit of the combine.

To elevate the grain received and collected by the crop conveyor 24a, separate loading elevators 80 and 81 are provided for each of the grain tanks 20a, 21a. Each of the loading elevators 80, 81 includes a rectangular housing structure 82 enclosing a continuous chain 83 on which a plurality of pusher paddles 84 are situated. The pusher paddles 84 lift the grain from the crop conveyor 24a and deposit it through a hood 85 at the top of the respective elevators 80, 81 and into the side tanks 20a, 21a.

Since the crop auger 24a includes double auger flights 77, 78 which direct the harvested grain in opposite directions, it will be appreciated that the harvested grain is divided and substantially equally proportioned between the two side tanks 20a, 21a. By depositing equal amounts of grain in each of the two tanks 20a, 21a, the combine can be kept in lateral balance as the amount of grain in each of the tanks increases.

Similar to the first embodiment, a discharge conveyor 42a is coupled to the side tank 21a in order to unload the combine 10a. The discharge conveyor 42a includes an auger 43a journalled in a tube 44a that extends upwardly and outwardly from the combine body 11a. The discharge conveyor has an opening 45a through which grain is received from the bottom of the side tank 21a.

In further accordance with this embodiment of the invention, to unload the grain from the side tank 20a, a vertical transfer conveyor 50a is provided which temporarily moves the grain into the side tank 21a. The transfer conveyor 50a includes an auger 51a journalled in a tubular passage 52a disposed vertically along one side of the combine cleaning and separating unit. An opening 54a in the bottom of the conveyor 50a receives grain from the side tank 20a and an opening 55a at the upper end of the conveyor discharges grain into a chute 86 which directs the grain down one side of the sloping roof 23a and into the other side tank 21a.

As in the first embodiment, the transfer conveyor 50a is driven by a belt 60a coupling the combine engine to a drive pulley 64a mounted on a gear case 65a. The gear case 65a encloses a shaft 66a and bevel gears (not shown) which are drivingly coupled to the auger 51a. The discharge conveyor 42a is driven by a pulley 68a coupled to the auger 43a and driven by a belt 69a suitably connected to a drive pulley on the combine engine. The discharge conveyor 42a also has a larger capacity than the transfer conveyor 50a and the discharge auger 43a is rotated at a speed effective to remove all of the grain from the side tank 20a contemporaneously with the transferral of the grain in side tank 20a by the transfer auger 51a so that the two side tanks can be exhausted essentially simultaneously.

I claim as my invention:

1. An agricultural harvesting machine including a body portion enclosing grain cleaning and separating mechanisms with a pair of side tanks extending down along opposite sides of the machine body for temporarily storing harvesting grain received from the cleaning and separating mechanisms, characterized by, a central tank portion interconnecting the side tanks and defined by a gabled roof portion of the machine body, a transfer conveyor having a lower end disposed in one of said side tanks and extending upwardly therefrom adjacent said central tank portion, said lower end having an opening therein for receiving grain from said one side tank, said transfer conveyor including a sloping tubular member extending over the top of said gabled roof portion for discharging grain received from said one side tank down over said gabled roof portion and into said other side tank, a discharge conveyor coupled to said other side tank with an opening through which grain is received from the bottom of said other side tank for unloading and depositing grain from said tanks into a suitable receptacle, and separate driving means for said discharge conveyor and said transfer conveyor, respectively, said driving means being arranged so that said discharge conveyor is effective to remove all of the grain from said other side tank contemporaneously with the transferral of grain from one side tank by said transfer conveyor so that said pair of side tanks can be exhausted essentially simultaneously.

2. The harvesting machine of claim 1 wherein said sloping tubular member is disposed adjacent one sloping side of said gabled roof portion and defines a discharge opening adjacent the top of said gabled roof so that grain withdrawn from said one side tank is discharged down the other sloping side of said gabled portion into said other side tank.

3. The harvesting machine of claim 1 wherein said transfer conveyor includes an auger flight journalled in a substantially vertical auger tube extending upwardly from said one side tank and said sloping tubular member is coupled to the top of said auger tube and extends downwardly over said gabled roof portion for discharging grain into said other side tank.

References Cited by the Examiner
UNITED STATES PATENTS

| | | | |
|---|---|---|---|
| 2,998,152 | 8/61 | Wognum et al. | 214—522 |
| 3,108,703 | 10/63 | Horne et al. | 214—17 |

HUGO O. SCHULZ, *Primary Examiner.*